United States Patent [19]
McCulloch et al.

[11] 3,921,745
[45] Nov. 25, 1975

[54] ELECTRIC BICYCLE

[75] Inventors: Robert P. McCulloch, Los Angeles; Stephen Hagar Smith, San Pedro, both of Calif.

[73] Assignee: McCulloch Corporation, Los Angeles, Calif.

[22] Filed: July 23, 1973

[21] Appl. No.: 381,447

[52] U.S. Cl............ 180/33 C; 180/33 D; 180/34; 301/6 D
[51] Int. Cl.............................. B62d 3/00
[58] Field of Search.... 180/33 R, 33 C, 33 D, 33 B, 180/31, 34, 65; 301/6 V, 6 D; 318/341

[56] References Cited
UNITED STATES PATENTS

| | | | |
|---|---|---|---|
| 613,732 | 11/1898 | Steffens | 180/34 |
| 710,329 | 9/1902 | Marks | 180/33 C |
| 1,378,563 | 5/1921 | Schofield | 301/6 D |
| 1,503,935 | 8/1924 | Baker | 180/33 C |
| 2,560,991 | 7/1951 | Schuricht | 180/33 X |
| 2,595,749 | 5/1952 | Arnot | 180/65 R |
| 3,431,994 | 3/1969 | Wood, Jr. | 180/65 R |
| 3,569,810 | 3/1971 | Thiele | 318/341 |
| 3,678,356 | 7/1972 | Van Ostrand | 318/341 |
| 3,694,721 | 9/1972 | Henry | 318/341 |
| 3,783,360 | 1/1974 | Bundy | 318/341 |
| 3,811,080 | 5/1974 | Morton et al. | 318/341 |

FOREIGN PATENTS OR APPLICATIONS

| | | | |
|---|---|---|---|
| 870,657 | 3/1942 | France | 180/34 |

*Primary Examiner*—Allen N. Knowles
*Attorney, Agent, or Firm*—Burns, Doane, Swecker & Mathis

[57] ABSTRACT

An electric bicycle employing chain, V-belt or friction pulley drives and a motor controller circuit variable in both frequency and duty cycle. Regenerative braking and the conversion of the motor to a transformer for charging the bicycle battery is disclosed as is both tires and a rim adapter to convert a standard bicycle rim to a belt drive. The pressure of the armature brushes of the motor is variable under light load conditions to increase motor efficiency.

24 Claims, 15 Drawing Figures

ELECTRIC BICYCLE

BACKGROUND OF THE INVENTION

The present invention is directed to an electric motor powered bicycle.

The use of electric motors to drive bicycles is well known. Such bicycles have generally suffered from several significant disadvantages including the size and weight of the battery and the inefficiency of known controller circuits. In addition, heavy transformers have generally been required to effect recharging of the bicycle battery and the motor friction losses have been substantially constant at all load conditions thereby reducing motor efficiency under light load conditions. Regenerative braking has not generally been employed.

It is accordingly an object of the present invention to obviate these and many other disadvantages of known electric bicycles and to provide a novel electric bicycle.

It is another object of the present invention to provide a novel electric bicycle in which the current applied to the motor is variable both in frequency and in duty cycle.

It is still another object of the present invention to pvovide a novel electric bicycle in which the motor friction losses are overcome in a zero load setting of the speed control and in which motor friction losses are significantly reduced under light load conditions.

Yet another object of the present invention is to provide a novel electric bicycle in which regenerative braking is available both through the speed control and independently through a sensor responsive to the braking foot pressure of the cyclist on the bicycle pedals.

A further object of the present invention is to provide an electric bicycle in which the motor may be modified to serve as a transformer for charging the bicycle battery.

Still a further object of the present invention is to provide a novel electric bicycle having chain, V-belt or friction pulley drives.

Yet still a further object of the present invention is to provide a novel electric bicycle in which the electrical connector for battery charging is carried by the bicycle and mechanically interlocked with the conversion of the electric motor to the transformer mode.

Yet a further object of the present invention is to provide a novel rim adapted easily mounted on a standard bicycle rim whereby the bicycle may be belt driven.

These and many other objects of the present invention will become apparent to one skilled in the art to which the invention pertains from a perusal of the following detailed description when read in conjunction with the appended drawings.

THE DRAWINGS

The many facets of the present invention may be more readily understood by reference to the accompanying drawings in which.

THE DETAILED DESCRIPTION

Figure 1:
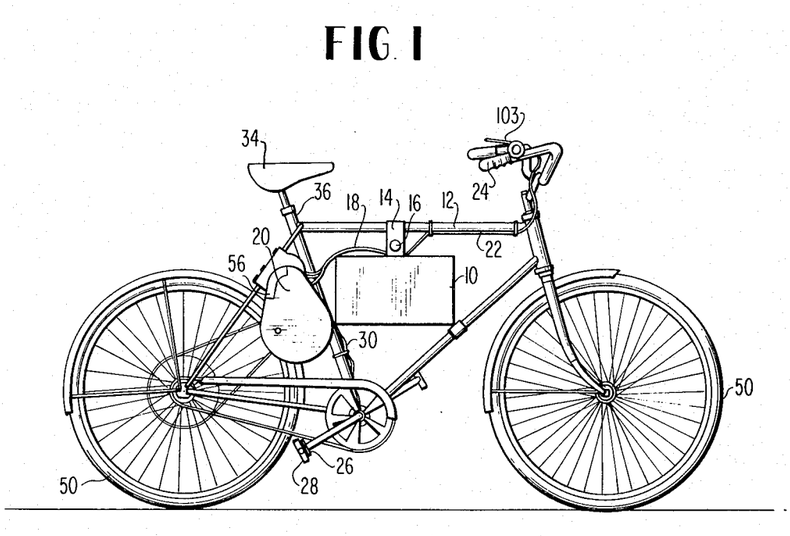
FIG. 1 is a pictorial view in elevation of one embodiment of the electric bicycle of the present invention.

With reference now to FIG. 1 where a preferred embodiment of the present invention is illustrated, a battery 10 may be suspended from the horizontal crossbar 12 of the frame of the bicycle by a U-shaped bracket member 14. A manually operable switch 16 may extend laterally from the bracket 14 to interrupt the application of power from the battery 10 through an appropriate electrical cable 18 to the controller circuit and direct current motor generally indicated at 20. Also connected to the controller circuit and motor 20 by way of an electrical cable 22 is a handlebar throttle and braking control 24 which may be of the conventional twist grip type. In addition or in lieu thereof, a foot pressure responsive throttle and/or brake control 26 may be carried by one of the pedals 28 and may be connected through slip rings (not shown) and an electrical cable 30 to the motor controller and motor 20.

Figures 2, 3:
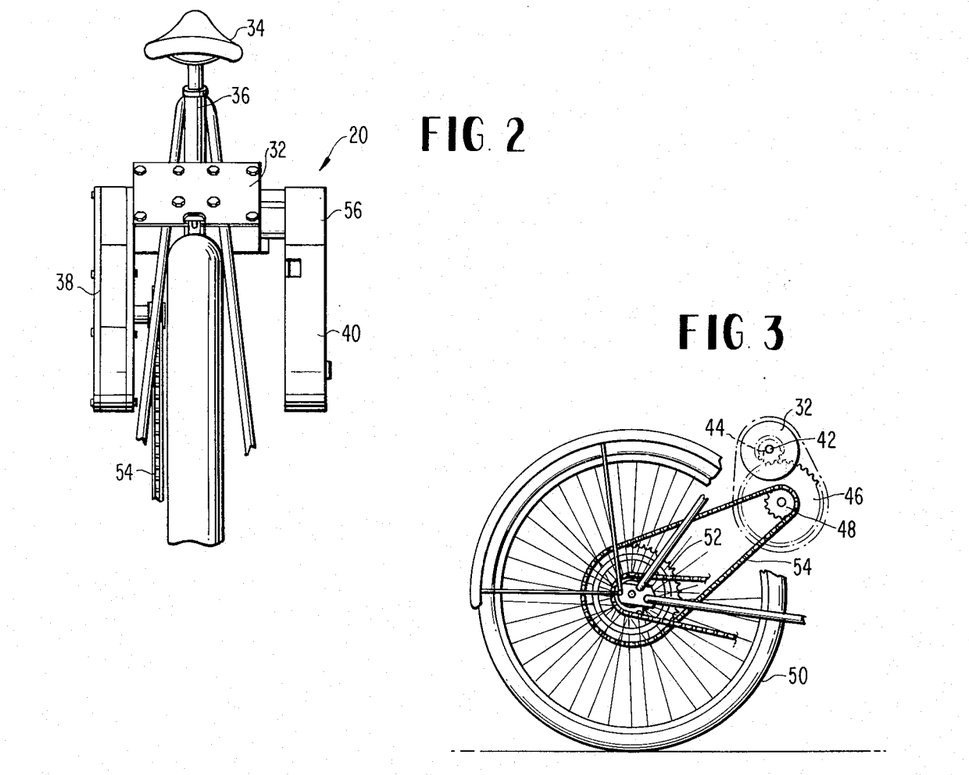
FIG. 2 is a partial pictorial view of the motor gearbox and controller circuit of the present invention from the rear of the bicycle illustrated in FIG. 1.
FIG. 3 is a partial elevational view illustrating the chain drive of the bicycle illustrated in FIG. 1.

As shown in more detail in FIG. 2, the motor 32 may be mounted beneath the seat 34 of the bicycle and to the rear of the upright seat 34 supporting frame member 36. Suspended from the left side of the motor 32 may be a generally egg-shaped gearbox 38. A similarly shaped frame for the controller circuit housing 40 may be suspended from the right side of the motor 32 and serve not only as a heat sink for the circuit but also as a housing for an electrical conductor reel as will hereinafter be described.

The controller circuit for the direct current motor 32 may be of any suitable conventional type or may, for example, be of the type claimed and described in the Stephen H. Smith U.S. Pat. No. 3,855,511 for "Traction Motor Controller Circuit and Method" issued Dec. 17, 1974 and assigned to the assignee of the present invention. The disclosure in said U.S. Pat. No. 3,855,511 is hereby incorporated herein by reference.

The use of a suitable conventional strain gauge responsive to the foot pressure of the cyclist on the pedals 28 of the bicycle as the throttle control for the motor controller circuit is advantageous in that the electric motor may thereby be operated in an "assist" mode in which the torque provided by the motor is a function of the effort expended by the cyclist in pedalling the bicycle.

As shown in FIGS. 1 and 3, the shaft 42 of the motor 32 may be provided with a spur gear 44 which drivingly engages a gear 46 to rotate a further gear 48 fixedly carried thereby. The rear wheel 50 of the bicycle may be provided with a sprocket gear 52 and the gears 48 and 52 connected by a suitable conventional link chain 54 such as the conventional bicycle chain illustrated.

In the preferred embodiment illustrated, the sprocket gear 42 for the rear wheel 50 of the bicycle is approximately 7 inches in diameter and provided with 52 teeth around the periphery thereof. The gear ratio between the motor sprocket gear 48 and the wheel sprocket gear 52 is about 5:1 in the preferred embodiment with a gear ratio of about 12:1 between the motor shaft 44 and the motor sprocket gear 48. As a result, the gear ratio between the motor shaft 42 and the sprocket gear 52 is desirably about 62.4:1.

With continued reference to FIG. 2, the motor 32 may be provided at one end thereof with apparatus for converting the motor 32 to a transformer for battery charging purposes. As shown in more detail in FIG. 4, the apparatus may include an inverted U-shaped channel 56 pivotable about the shaft 48 of the motor 32 to expose a spring biased reel 58 rotatably mounted internally of the housing 40 of FIG. 2 on a shaft 60. As claimed and disclosed in more detail in the Stephen H. Smith U.S. Pat. No. 3,820,000 for "Method and Motor for Charging Batteries" issued June 25, 1974 and assigned to the assignee of the present invention, the pivoting of the channel 56 from the closed position illustrated in FIGS. 1 and 2 to the open position of FIG. 4 exposes a plug 62 and an electrical conductor 64 so that the conductor may be unreeled from the reel 58 against the spring bias thereof for connection to a suitable source of 115 volt alternating current. The rotation of the channel 56 to the open position illustrated in FIG. 4 may also accomplish effective brush rotation as described in said U.S. Pat. No. 3,820,000 and accomplish other circuit changes internally of the motor 32 so that the motor windings may be utilized as a transformer in the charging of the battery 10. The disclosure of said U.S. Pat. No. 3,820,000 is hereby incorporated herein by reference.

Figures 4, 5:
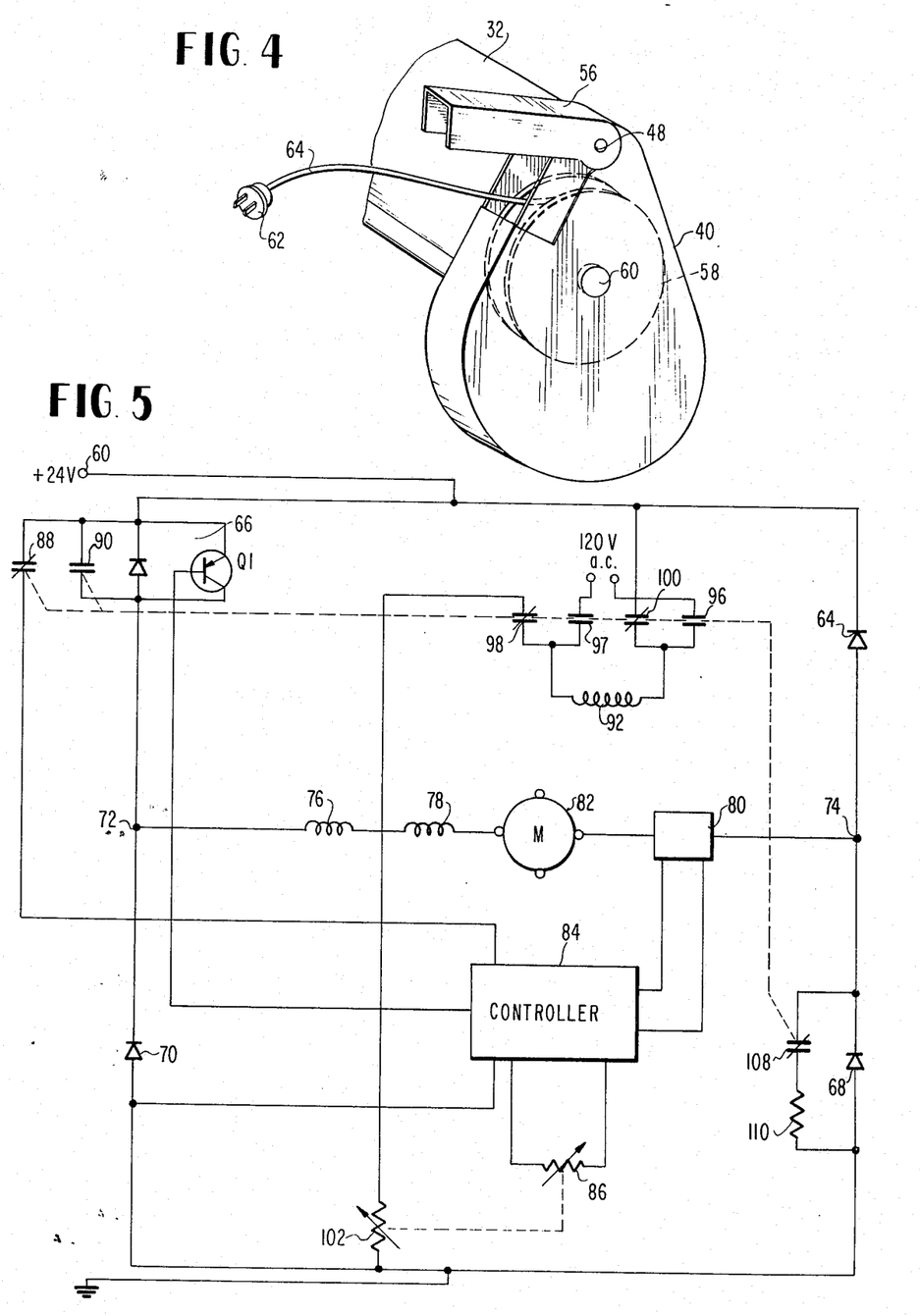
FIG. 4 is a pictorial view of the recharging connector storage reel.
FIG. 5 is a schematic circuit diagram of one embodiment of the electrical circuit of the present invention.

With reference to FIG. 5 where one embodiment of the circuitry of the present invention is schematically illustrated, the voltage of the battery 10 of FIG. 1 is applied across terminals 60 and 62 of a diode bridge circuit which includes diodes 64 and 66 in the upper right and left arms respectively thereof and diodes 68 and 70 in the lower right and left arms respectively thereof. The terminals 72 and 74 interconnecting the midpoints of the left and right arms of the bridge circuit are connected by way of the series field winding 76 of the motor 32 of FIG. 2, a brush pressure control winding 78, the armature 82 of the motor 32, and a current sensor 80.

The sensor 80 may be connected to a controller circuit 84 of the type described in the aforesaid U.S. Pat. No. 3,855,511 which may be provided with a throttle adjustment 86 of the type illustrated in FIG. 1 as the twist grip handlebar throttle 24 or the foot pedal throttle 26. The output signal from the controller circuit 84 may be utilized to control the conduction of a switch such as that schematically illustrated as the PNP transistor Q1.

The emitter-collector path of the transistor Q1 may be paralleled by the diode 66 in the upper left arm of the bridge circuit and by the normally open electrical contacts 90 of the motor/charger switch subsequently discussed in greater detail in connection with FIGS. 4 and 5. The direct current input terminal 60 may also be connected by way of the normally closed contacts 88 of the motor/charger switch to the controller circuit 84.

With continued reference to FIG. 5, the shunt field winding 92 of the motor may be connected through a pair of normally open contacts 94 and 96 of the motor/charger switch to a source of 120 volt alternating current by means of the electrical cable 64 and plug 62 illustrated in FIG. 4. The shunt field winding 92 of the motor 32 may also be connected through the normally closed contacts 98 and 100 of the motor/charger switch to the direct current source terminals 60 and 62 by way of a potentiometer 102. The potentiometer 102 may be indenpendent of the potentiometer 86 or may be operable simultaneously therewith in the opposite direction to provide regenerative braking as will be subsequently explained in greater detail. Mechanical braking may, of course, be provided in the conventional manner by means of a hand brake lever 103 on the handlebar of the bicycle as shown in FIG. 1 or the conventional pedal operated coaster brake. The normally closed contacts 108 of the motor/charger switch are also operable to connect a resistor 110 in parallel with the diode 68.

The diodes 64 and 68 of the bridge circuit may be replaced by SCRs if the charging operation is to be controlled.

In operation in the motor mode, direct current from the terminal 60 is applied through the normally closed contacts 98 and 100 of the motor/charger switch to the shunt field winding 92. In addition, the armature 82 of the motor 32 is connected in series with the series field winding 76 through the transistor Q1, the normally closed contacts 108 and the resistor 110. In the motor mode, power is also applied from the battery 10 by way of the terminal 60 through the normally closed contacts 88 of the motor/charger switch to the controller circuit 84. The position of the throttle potentiometer 86 of the controller 84 determines the degree of conduction of the transistor Q1 and thus motor torque.

The throttle potentiometer 86 is desirably biased to provide in the rest position, i.e., the minumum or zero torque position, a signal to the transistor Q1 to effect the conduction thereof sufficiently to overcome the friction of the motor. In this way, the motor does not act as a brake when the bicycle is pedalled without the assistance of the motor. This current is not excessive and has been found to be on the order of 0.33 ampheres in the preferred embodiment. Bias for this minumum or zero torque setting may be provided by any suitable conventional means such as a ball and detent in the throttle structure.

The twist grip control may also be utilized to provide the shunt field winding 92 with sufficient current so that regenerative braking will occur when, for example, the bicycle is going downhill. This may be accomplished by varying the potentiometers 86 and 102 in opposite directions by the operation of the twist grip.

The positioning of the twist grip throttle control 24 illustrated in FIG. 1 below at minimum or zero torque setting will thus not only remove the motor friction combating current through the transistor Q1 in the circuit of FIG. 5 by modifying the resistance 86, but will also increase the current through the potentiometer 102 and thus the shunt field winding to thereby increase the regenerative braking effects of the motor 32. The current so generated may be applied to the battery 10 to effect the recharging thereof through the diodes 62 and 68.

Where the potentiometer 86 of the controller 84 and the potentiometer 102 are not simultaneously controlled, it has been found desirable to locate the potentiometer 102 on the pedals 28 of the bicycle as illustrated in FIG. 1 so that regenerative braking may be increased by the normal pressure of the cyclist on the pedals in the reverse direction.

Figure 6:
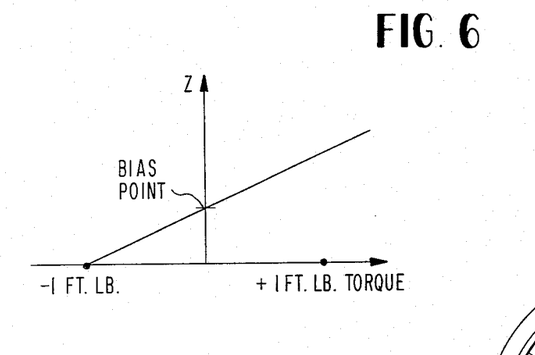
FIG. 6 is a graph illustrating the continuous transition from torquing to regenerative braking provided by the electrical motor.

As illustrated in FIG. 6, the transition from regenerative braking to positive torque may be accomplished smoothly by a variation in the impedances 86 and 108. This variation may be accomplished continuously without discrete incremental steps.

The winding 78 in series with the series field winding 76 and the armature 82 of the motor 32 may be utilized to effect variations in the pressure of the armature brushes in a manner explained in detail in the copending Stephen H. Smith application Ser. No. 348,047 for "Motor Field Strength Variable Brush Pressure Apparatus and Method" filed July 11, 1973 and assigned to the assignee of the present invention. The disclosure of said application Ser. No. 348,047 is hereby incorporated herein by reference.

With continued reference to FIG. 5 and with reference again to FIG. 4, the pivoting of the channel 56 about the shaft 42 of the motor 32 to permit the connection of the plug 62 to a suitable source of 120 volt alternating current accomplishes the effective one-half pole pitch rotation of the motor brushes as described in said U.S. Pat. No. 3,820,000. In addition, the pivoting of the channel 56 is operable to operate the motor/charger switch and thus the contacts 94, 96, 98, 88, 90, and 108 to place the circuit in the transformer mode.

The closing of the normally open contacts 94 and 96 makes possible the application of alternating current to the shunt field winding 92 of the motor 32 while the opening of the normally closed contacts 98 and 100 disconnects the battery 10 from the shunt field winding 92.

In this mode, the shunt field winding serves as the primary winding of a transformer. The windings of the armature 82 and the series field winding serves as the secondary winding of the transformer to apply current alternatively through the diodes 66 and 68 and through the diodes 64 and 70. Alternating current transformer coupled through the windings of the motor from the 120 volt a.c. terminals may thus be rectified by the bridge circuit and applied to the battery 10 to effect the charging thereof.

Figure 7:
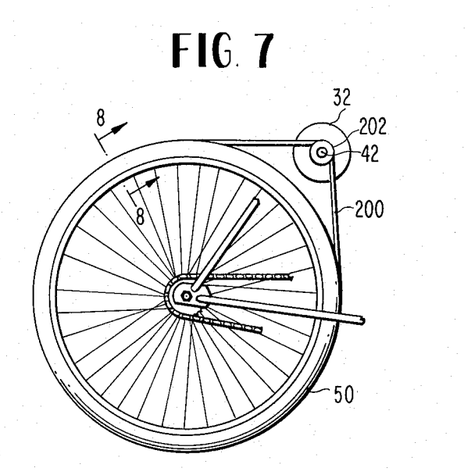
FIG. 7 is a partial elevation of one embodiment of an alternate V-belt drive.
Figure 8:
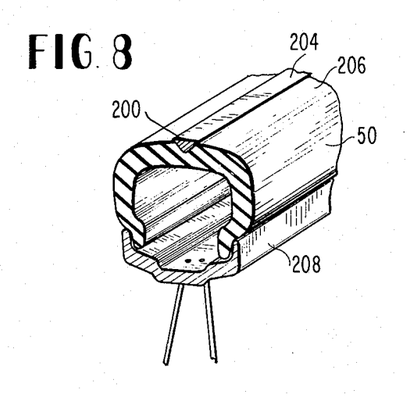
FIG. 8 is a section taken through lines 8—8 of FIG. 7.

An alternate embodiment of the drive for the present invention is illustrated in FIGS. 7 and 8 where the rear wheel 50 of the bicycle of FIG. 1 may be provided with a tire having a centrally disposed groove around the radially outer periphery thereof to receive a V-shaped belt 200. The motor 32 of the bicycle of FIG. 2 may be provided with a suitable conventional pulley 202 mounted on the shaft 42 and compatible with the shape of the belt 200. The tension in the belt 200 may be adjusted by conventional techniques such as an idler pulley (not shown) to provide a driving connection between the shaft 42 of the motor 32 and the rear wheel 50 of the bicycle.

The outer substantially planar surface 204 of the V-shaped belt 200 may be substantially flush with the tread 206 of the tire to provide a smooth ground engaging surface. The weight of the bicycle and cylist may provide additional traction if the belt 200 is slightly oversize and extends radially outward beyond the tread surface 206 of the tire where the upward pressure of the ground increases the frictional engagement between the belt 200 and the tire.

Figure 8A:
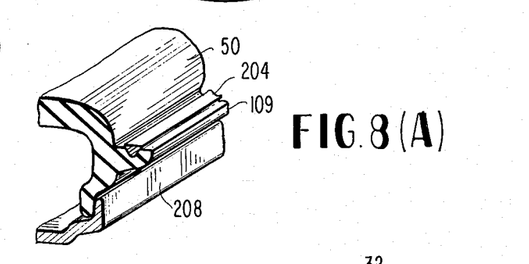
FIG. 8(A) is a partial section of another V-shaped belt drive embodiment.

In another embodiment as illustrated in FIG. 8(A), the tire 50 may be provided with a laterally extending projection 109 grooved to accommodate the V-shaped belt 200. By this construction, the tire of a bicycle may be replaced in adapting a bicycle for driving by an electric motor without replacement of the entire wheel.

Figure 9:
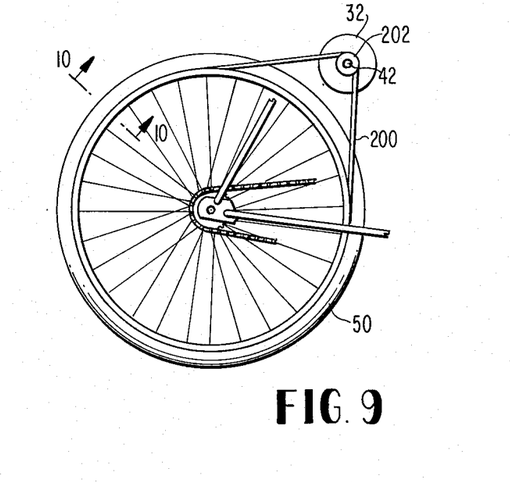
FIG. 9 is a partial elevation of a rim belt drive for the bicycle of the present invention.
Figure 10:
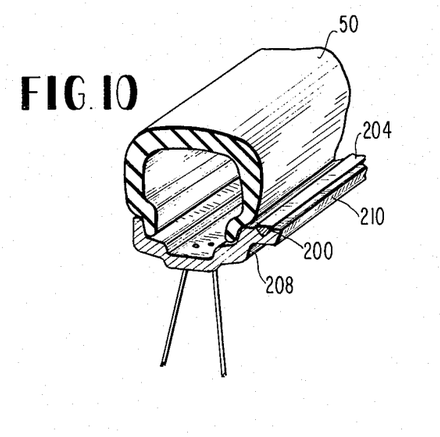
FIG. 10 is a section taken through lines 10—10 of FIG. 9.

Another embodiment of a drive for the bicycle of the present invention which has been found satisfactory is illustrated in FIGS. 9 and 10. With reference to FIGS. 9 and 10, the rim 208 of the bicycle wheel 50 may be provided with a laterally extending flange 210 and the radially outer surface of the flange 210 may be grooved to receive a belt 200 as described in connection with FIGS. 7 and 8.

Figure 11:
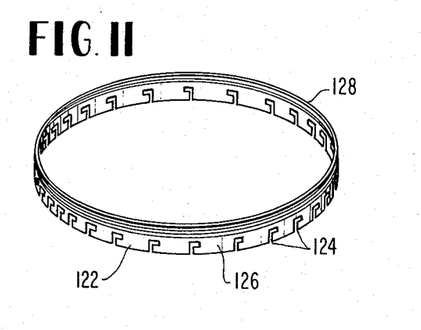
FIG. 11 is a pictorial view of one embodiment of the rim adapter of the present invention.
Figure 12:
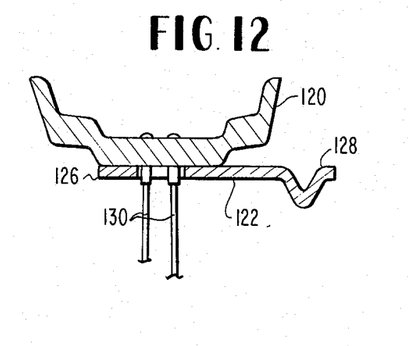
FIG. 12 is a section in elevation taken through the rim of a bicycle with the adapter of FIG. 11 in place thereon.

The rim 208 and the flange 210 for the rim drive embodiment illustrated in FIGS. 9 and 10 may be integral as illustrated in FIG. 10. Alternatively, as illustrated in FIG. 12, a bicycle rim 120 may be provided with an attachment of the type illustrated in FIG. 11. With reference now to FIGS. 11 and 12, a band 122 may be provided with a number of generally L-shaped slots 124 opening to one edge 126 thereof. The other edge 128 of the band 122 may be configured to form a V compatible with the belt 200 described in the embodiments of FIGS. 7—10.

To install, the band 122 may be placed on the rim 120 of the bicycle so that each of the spokes of the rear wheel enter into the open end of one of the L-shaped slots 124. The band 122 may then be angularly rotated with respect to the rim 120 so that the spokes 130 of the wheel are positioned in the closed end of the L-shaped slots 124.

Figure 13:
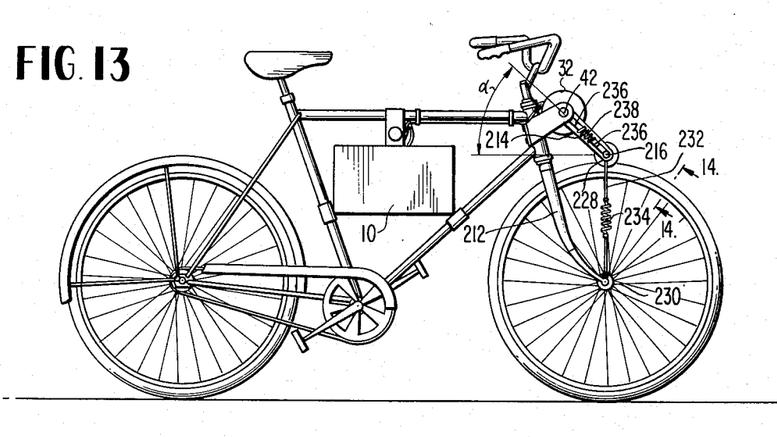
FIG. 13 is a pictorial view in elevation of a second embodiment of the bicycle of the present invention with a front wheel drive.
Figure 14:
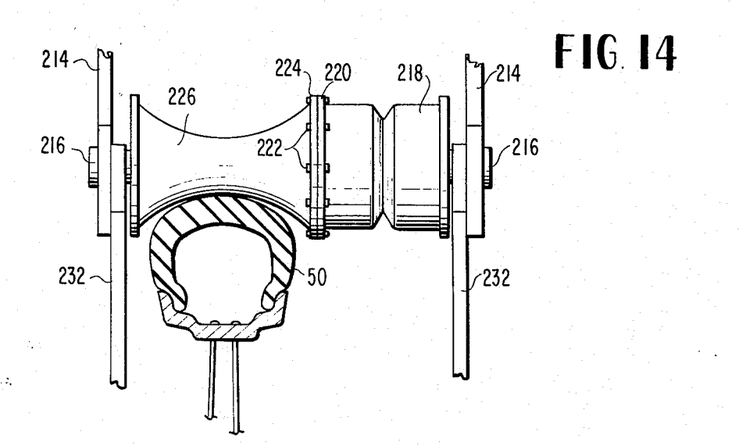
FIG. 14 is a section taken through lines 14—14 of FIG. 13.

Yet another drive for the bicycle of FIG. 1 is illustrated in FIGS. 13 and 14 wherein the motor 32 may be mounted on the front fork 212 of the bicycle. Forwardly and downwardly extending support members 214 may be carried by the fork 212 of the bicycle to rotatably support a shaft 216. As illustrated in greater detail in FIG. 14, the shaft 216 may be provided with a pulley 218 configured to accommodate the V-shaped belt 200 earlier described. The pulley 218 may be provided with a flange 220 which may be secured by any suitable conventional means such as the illustrated fasteners 222 to a flange 224 of a friction spool 226. The friction spool 226 may be configured to conform to the tread of the bicycle tire 50.

The angle between the tangent 228 of the wheel 50 at the point of engagement with the spool 226 is relatively important and should be between 25° and 35°, preferably about 30°.

Driving engagement between the spool 226 and the tire 50 may be provided as shown in FIG. 13 by a suitable conventional tension member connected between the shaft 216 and the axle 230 of the front wheel of the bicycle. By way of example, the tension member may include telescoping rods 232 and a coil spring 234.

Alternatively, the frictional engagement between the spool 226 and the tire 50 may be provided by a compression resistant member between the shaft 42 of the motor 32 and the shaft 216 on opposite sides of the tire 50. This compression resistant member may, as schematically illustrated in FIG. 13, include telescoping rods 136 and a coil spring 238.

ADVANTAGES AND SCOPE OF THE INVENTION

As is apparent from the foregoing detailed descripion, the electric bicycle of the presen invention represents significant improvement over similar vehicles. For example, the use of the variable frequency and pulse width controller described and claimed in said U.S. Pat. No. 3,855,511 may be utilized with a variety of motors such as a four-pole permanent magnet, one-half horsepower motor or a two-thirds horsepower, 50% compound motor to achieve a marked increase in efficiency.

The controller as described may be varied in frequency up to about 400 Hertz and may be variable in duty cycle from 0 to 99%.

For example, a one-half horsepower motor at 14,000 rpm may be utilized with a gear ratio of approximately 60:1 to convert approximately 1 foot pound of torque at the motor to about 50 linear foot pounds at the road. With a 15 amphere-hour, 24 volt battery, the embodiment illustrated may be driven on level road 30 miles at a speed of 14 mph under no wind conditions. As might be expected, top speed of 25 mph may exhaust the battery supply in a distance of about 5 miles. This limitation is not, however, significant in that normal bicycle speeds with hard pumping on the pedals is in the range of 10 to 12 mph. The cost of recharging the battery is generally about 8 cents for the necessary one-half killowatt-hour of electrical energy.

The present invention is adapted for both coaster and derailleur brakes and does not significantly increase the weight on the bicycle. For example, the battery as described may weigh about 20 pounds and the controller and drive unit about 20 pounds.

The normal friction load of the motor is desirably overcome by the biasing of the speed control to provide sufficient current at a zero speed position to achieve the minimal torque necessary to overcome motor friction. The transition from torquing to regenerative braking may be accomplished by means of the same speed control continuously in a linear fashion and the speed control may be a conventional twist grip handlebar control or a sensing means responsive to the foot pressure of the cyclist on the bicycle pedals. Alternatively, the foot control may be utilized to provide regenerative braking control while the twist grip control is utilized independently for controlling motor torque.

As described in said copending application Ser. No. 378,047, the pressure with which the armature brushes of the motor of the present invention engage the commutator of the motor may be reduced under light load conditions to significantly increase the efficiency of the motor.

Moreover, the bicycle of the present invenion may be provided with a battery charger circuit as described in said U.S. Pat. No. 3,820,000 whereby the motor carried by the bicycle may be utilized as the transformer to recharge the battery. In this manner, the weight of an additional transformer may be eliminated.

The housing for the controller circuit may be utilized as a heat sink therefor and may, in addition, house an electrical conductor on a reel. The electrical conductor facilitates recharging of the battery without the removal thereof from the bicycle frame and the access door to the electrical conductor may effect the brush rotation necessary to convert the motor to the transformer mode as described in said U.S. Pat. No. 3,820,000.

Chain, V-belt, and friction pulley drives may be utilized with the bicycle of the present invention and the utilization of a slightly oversized V-belt within the tire tread significantly reduces the likelihood of slippage due to the weight of the cyclist on the bicycle. When conversion of an existing bicycle to the electric bike of the present invention is desired, a bicycle rim belt or a tire mount may be utilized.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electric bicycle comprising:
   a bicycle;
   a battery carried by the frame of said bicycle;
   a direct current motor carried by the frame of said bicycle;
   manually operable throttle means carried by the frame of said bicycle; and;
   a variable frequency, variable pulse width controller circuit carried by the frame of said bicycle and electrically connected to said battery, said direct current motor, and to said throttle means for controlling the flow of current from said battery to said motor in response to said throttle means, said controller circuit comprising:
   an electronic switch having a control terminal,
   a diode,
   circuit means connecting said battery, said electronic switch and said direct current motor in series and connecting said diode in parallel with said motor opposing the flow of direct current from said battery through said electronic switch,
   means for sensing the direct current flowing through said motor, and
   means operatively connected and responsive to said sensing means for controlling the frequency and duration of the conduction of said electronic switch.

2. The bicycle of claim 1 including manually operable means for increasing the current in the field windings of said motor for regenerative braking.

3. The bicycle of claim 1 wherein said throttle means includes means for increasing current in the field windings of said motor for regenerative braking.

4. The bicycle of claim 1 wherein said means drivingly connecting said motor to a wheel of said bicycle includes a pulley carried by the shaft of said motor and an endless V-shaped cross section belt drivingly connecting said pulley and a wheel of said bicycle.

5. The bicycle of claim 4 wherein said bicycle includes a tire having a groove disposed in the tread around the radially outer periphery of said tire; and, wherein said belt is disposed within said groove, the radially outer surface of said belt extending slightly beyond the tread of said tire whereby the engagement of said belt with the ground increases the frictional contact between said belt and said tire.

6. The bicycle of claim 4 wherein said bicycle includes a wheel rim having a portion laterally extending beyond the tire mounted on the rim, said portion having a radially outer surface configured to receive said belt.

7. An electric bicycle comprising:
a bicycle;
a battery carried by the frame of said bicycle;
a direct current motor carried by the frame of said bicycle;
manually operable throttle means carried by the frame of said bicycle; and,
a variable frequency, variable pulse width controller circuit carried by the frame of said bicycle and electrically connected to said battery, said direct current motor, and to said throttle means for controlling the flow of current from said battery to said motor in response to said throttle means,
said motor being carried by the frame of said bicycle at an elevation approximately that of the maximum elevation of the wheels of said bicycle and substantially in line with the forward extremity of the rear wheel of said bicycle with the longitudinal axis of said motor substantially horizontal and normal to the longitudinal axis of said bicycle,
said controller circuit being carried by said bicycle laterally of the wheels of said bicycle on one side of said motor, and
said means drivingly connecting said motor to a wheel of said bicycle including a gearbox carried by said bicycle laterally of the wheels thereof on the other side of said motor and a chain drivingly connecting said gearbox to the rear wheel of said bicycle.

8. An electric bicycle comprising:
a bicycle;
a battery carried by the frame of said bicycle;
a direct current motor carried by the frame of said bicycle;
manually operable throttle means carried by the frame of said bicycle; and,
a variable frequency, variable pulse width controller circuit carried by the frame of said bicycle and electrically connected to said battery, said direct current motor, and to said throttle means for controlling the flow of current from said battery to said motor in response to said throttle means,
said means drivingly connecting said motor to a wheel of said bicycle including a pulley carried by the shaft of said motor and and endless V-shaped cross section belt drivingly connecting said pulley and a wheel of said bicycle, and
said bicycle including a tire having a projection laterally extending beyond the tread thereof, said projection being configured on the radially outer surface thereof to receive said belt.

9. An electric bicycle comprising:
a bicycle;
a battery carried by the frame of said bicycle;
a direct current motor carried by the frame of said bicycle;
manually operable throttle means carried by the frame of said bicycle; and,
a variable frequency, variable pulse width controller circuit carried by the frame of said bicycle and electrically connected to said battery, said direct current motor, and to said throttle means for controlling the flow of current from said battery to said motor in response to said throttle means,
said means drivingly connecting said motor to a wheel of said bicycle including a pulley carried by the shaft of said motor and an endless V-shaped cross section belt drivingly connecting said pulley and a wheel of said bicycle,
said bicycle including a metal band provided with a number of generally L-shaped grooves opening to one edge thereof, each of said grooves being adapted to receive a spoke of one of the wheels of said bicycle immediately adjacent the rim in the closed end thereof to thereby secure said band to said rim, said band extending laterally beyond the tire of said rim at the other edge thereof and being configured to receive said belt.

10. An electric bicycle comprising:
a bicycle;
a battery carried by the frame of said bicycle;
a direct current motor carried by the frame of said bicycle;
manually operable throttle means carried by the frame of said bicycle; and,
a variable frequency, variable pulse width controller circuit carried by the frame of said bicycle and electrically connected to said battery, said direct current motor, and to said throttle means for controlling the flow of current from said battery to said motor in response to said throttle means,
said motor including:
armature and field windings,
means for electrically connecting said armature winding to encircle minimum electromagnetic flux passing through the armature,
first switch means by which said battery may selectively be electrically connected to said windings,
a rectifier,
second switch means by which a source of alternating current may selectively by electrically connected to one of said windings, and
means for selectively electrically connecting said armature winding to encircle maximum electromagnetic flux passing through the armature.

11. The bicycle of claim 10 wherein said controller circuit is carried within a housing;
wherein said electric bicycle further includes a reel rotatably mounted within said housing and a two-wire electrical conductor wound on said reel, said conductor having a connector on the free end thereof and being electrically connected to said second switch means at the other end thereof; and,
wherein said means for electrically connecting said armature winding comprises:
a rocker arm pivotable between first and second positions about an axis substantially parallel to the axis of said motor,
an armature brush carried by said rocker arm adjacent one end thereof, said armature brush being configured to substantially conform to the outer circumference of and to pressurally engage the armature of said motor at a first predetermined angular position to thereby establish an electrical connection with the armature winding when said rocker arm is in said first position,
an electrical contact carried by the other end of said rocker arm adjacent the other end thereof to pressurally engage the armature of said motor at a second predetermined angular position displaced angularly from said first angular position to establish an electrical connection with the armature winding when said rocker arm is in said second position, means for biasing said rocker arm to said first position, and means for overriding the bias of said biasing means to position said rocker arm in said second position to thereby modify the angular position of the electrical connection of said armature winding, said overriding means being operable to expose said connector when overriding the bias of said bias means.

12. The bicycle of claim 11 wherein said housing is disposed in a heat receiving relationship to said controller circuit to act as a heat sink therefor.

13. An electric bicycle comprising:
a bicycle;
a battery carried by the frame of said bicycle;
a direct current motor carried by the front fork of said bicycle at an elevation above that of the maximum elevation of the front wheel of said bicycle with the longitudinal axis of said motor substantially horizontal and normal to the longitudinal axis of said bicycle;
manually operable throttle means carried by the frame of said bicycle;
a controller circuit carried by the frame of said bicycle and electrically connected to said battery, said direct current motor, and to said throttle means for controlling the flow of pulses of current from said battery to said motor in response to said throttle means; and,
means drivingly connecting said motor to a wheel of said bicycle, said means including a friction pulley drivingly connected to said motor and means biasing said friction pulley into engagement with the tread of the front wheel of said bicycle, the plane through the axis of said motor and the axis of said friction pulley being disposed at an angle of between about 25° and 35° to the line tangent to the front wheel of the bicycle at the point of engagement with said friction pulley.

14. The bicycle of claim 13 wherein said biasing means includes tension means connected between the shaft of said friction pulley and the axle of the front wheel of said bicycle.

15. The bicycle of claim 13 wherein said biasing means includes non-pivotable compression resistant means connected between said friction pulley and the shaft of said motor.

16. An electric bicycle comprising:
a bicycle;
a battery carried by the frame of said bicycle;
a direct current motor carried by the frame of said bicycle, said motor including:
armature and field windings,
means for electrically connecting said armature winding to encircle minimum electromagnetic flux passing through the armature,
first switch means by which said battery may selectively be electrically connected to said windings,
a rectifier,
second switch means by which a source of alternating current may selectively be electrically connected to one of said windings, and,
means for selectively electrically connecting said armature winding to encircle maximum electromagnetic flux passing through the armature, manually operably throttle means carried by the frame of said bicycle;
a controller circuit carried by the frame of said bicycle and electrically connected to said battery, said direct current motor, and to said throttle means for controlling the flow of current from said battery to said motor in response to said throttle means; and,
means drivingly connecting said motor to a wheel of said bicycle.

17. The bicycle of claim 16 wherein said controller circuit is carried within a housing;
wherein said electric bicycle further includes a reel rotatably mounted within said housing and a two-wire electrical conductor wound on said reel, said conductor having a connector on the free end thereof and being electrically connected to said second switch means at the other end thereof; and,
wherein said means for electrically connecting said armature winding comprises:
a rocker arm pivotable between first and second positions about an axis substantially parallel to the axis of said motor,
an armature brush carried by said rocker arm adjacent one end thereof, said armature brush being configured to substantially conform to the outer circumference of and to pressurally engage the armature of said motor at a first predetermined angular position to thereby establish an electrical connection with the armature winding when said rocker arm is in said first position,
an electrical contact carried by the other end of said rocker arm adjacent the other end thereof to pressurally engage the armature of said motor at a second predetermined angular position displaced angularly from said first angular position to establish an electrical connection with the armature winding when said rocker arm is in said second position,
means for biasing said rocker arm to said first position, and
means for overriding the bias of said biasing means to position said rocker arm in said second position to thereby modify the angular position of the electrical connection of said armature winding, said overriding means being operable to expose said connector when overriding the bias of said bias means.

18. The electric bicycle of claim 16 including means for sensing the load of said motor and for modifying the brush pressure of said motor at loads below the rated load of said motor.

19. An electric bicycle comprising:
a bicycle;
a battery carried by the frame of said bicycle;
a direct current motor carried by the frame of said bicycle;
means drivingly connecting said motor to a wheel of said bicycle;
manually operable throttle means carried by the frame of said bicycle;
a controller circuit carried by the frame of said bicycle and electrically connected to said battery, said direct current motor, and to said throttle means for controlling the flow of current from said battery to said motor in response to said throttle means; and,
means for biasing said throttle means to a position wherein said controller passes sufficient current to said motor from said battery to substantially neutralize motor friction.

20. The bicycle of claim 19 wherein said throttle means includes means carried by a pedal of said bicycle and responsive to the pressure of the foot of the cyclist on said pedal.

21. The bicycle of claim 19 including means carried by a pedal of said bicycle and responsive to the pressure of the foot of the cyclist on said pedal for increasing the current in the field windings of said motor for regenerative braking.

22. An electric bicycle comprising:
a bicycle;
a battery carried by the frame of said bicycle;
a direct current motor carried by the frame of said bicycle;
means drivingly connecting said motor to a wheel of said bicycle;
manually operable throttle means carried by the frame of said bicycle;
a controller circuit carried by the frame of said bicycle and electrically connected to said battery, said direct current motor, and said controller circuit for controlling the flow of current from said battery to said motor in response to said throttle means, and,
means for sensing the load of said motor and for modifying the brush pressure of said motor at loads below the rated load of said motor.

23. The bicycle of claim 22 including;
manually operable means for increasing the current in the field windings of said motor for regenerative braking;
a reel rotatably mounted within the housing for said controller circuit;
a two-wire electrical conductor wound on said reel and having a connector on the free end thereof and being electrically connected to said second switch means at the other end thereof;
wherein said motor includes:
armature and field windings,
first switch means by which said battery may selectively be electrically connected to said windings,
a rectifier,
second switch means by which a source of alternating current may selectively be electrically connected to one of said windings, and,
means for selectively electrically connecting said armature winding to encircle either a minimum or a maximum electromagnetic flux passing through the armature, said means comprising:
a rocker arm pivotable between first and second positions about an axis substantially parallel to the axis of said motor,
an armature brush carried by said rocker arm adjacent one end thereof, said armature brush being configured to substantially conform to the outer circumference of and to pressurally engage the armature of said motor at a first predetermined angular position to thereby establish an electrical connection with the armature winding when said rocker arm is in said first position.
an electrical contact carried by the other end of said rocker arm adjacent the other end thereof to pressurally engage the armature of said motor at a second predetermined angular position displaced angularly from said first angular position to establish an electrical connection with the armature winding when said rocker arm is in said second position,
means for biasing said rocker arm to said first position, and
means for overriding the bias of said biasing means to position said rocker arm in said second position to thereby modify the angular position of the electrical connection of said armature winding, said overriding means being operable to expose said connector when overriding the bias of said bias means:
wherein said controller circuit comprises:
an electronic switch having a control terminal,
a diode,
circuit means connecting said battery, said electronic switch and said direct current motor in series and connecting said diode in parallel with said motor opposing the flow of direct current from said battery through said electronic switch,
means for sensing the direct current flowing through said motor, and
means operatively connected and responsive to said sensing means for controlling the frequency and duration of the conduction of said electronic switch; and,
wherein said controller circuit passes sufficient current to said motor from said battery to substantially neutralize motor friction.

24. A rim adapter for a bicycle comprising a metal band provided with a number of generally L-shaped grooves opening to one edge thereof, each of said grooves being adapted to receive a spoke of one of the wheels of said bicycle immediately adjacent the rim in the closed end thereof to thereby secure said band to said rim, said band extending laterally beyond the tire of said rim at the other edge thereof and being configured to receive said belt.

* * * * *